United States Patent [19]

Ebata

[11] 4,056,868
[45] Nov. 8, 1977

[54] NET JOINTING STRUCTURE
[75] Inventor: Hiroyuki Ebata, Uozu, Japan
[73] Assignee: Yoshida Kogyo K.K., Japan
[21] Appl. No.: 727,797
[22] Filed: Sept. 29, 1976
[30] Foreign Application Priority Data
  Oct. 4, 1975  Japan .................. 50-120061
[51] Int. Cl.² ........................... A44B 19/00
[52] U.S. Cl. .................. 24/205.16 C; 24/205.16 R; 66/195; 66/193
[58] Field of Search ................ 66/190–195; 24/205.1 R, 205.1 C, 205.13, 205.16 C, 205.16 R

[56] References Cited
U.S. PATENT DOCUMENTS

| 1,139,342 | 5/1915 | Clewley | 66/193 |
|---|---|---|---|
| 1,139,343 | 5/1915 | Clewley | 66/193 |
| 2,992,550 | 7/1961 | Frith | 66/195 |
| 2,996,905 | 8/1961 | Scheibe | 66/192 |
| 3,118,294 | 1/1964 | Van Laethem | 66/193 |
| 3,171,272 | 3/1965 | Frith | 66/195 |
| 3,200,619 | 8/1965 | Frith | 66/195 |
| 3,242,699 | 3/1966 | Momoi | 66/193 |
| 3,299,674 | 1/1967 | Scheibe | 66/195 |
| 3,848,556 | 11/1974 | Terada et al. | 24/205.1 C |

Primary Examiner—Ronald Feldbaum
Attorney, Agent, or Firm—Bucknam and Archer

[57] ABSTRACT

A net jointing structure has a pair of warp-knitted net adapters for use in coupling or jointing net ends together. Each of the adapters has a net region and a web region, the net region being subdivided into at least two net sections one of which is smaller in mesh size than the other. The net section of a smaller mesh size is formed of a plurality of meshes made of warp chains and is coupled to the web region. The net section of a larger mesh size is adapted for connection with one of the net ends. The web region includes a plurality of warp chain pairs spaced uniformly along the length of the web region, the warp chain pairs being an extension of the warp chains, and the web region further including inlaid threads fastening the warp chain pairs together.

3 Claims, 6 Drawing Figures

NET JOINTING STRUCTURE

BACKGROUND OF THE INVENTION

1. Field of the Invention

The present invention relates to a net jointing structure having a pair of knitted net adapters for use in coupling or jointing net ends together by means of a sliding clasp fastener.

2. Description of the Prior Art

There are certain instances where it is necessary to joint two or more nets together so as to provide an elongate combination net. For example, it is customary in the round haul net fishery for a pair of fishing boats to carry identical halves of a round haul net, respectively, and then interconnect the net halves at a fishing ground. The conventional practice of coupling and uncoupling the net halves together has been to knot and unknot the confronting edges of the halves. This procedure is however an extremely tedious and time-consuming task.

In order to solve the foregoing problem, the inventor has already proposed a net jointing structure having a sliding clasp fastener for separably jointing or coupling a pair of nets together (U.S. Ser. No. 665,707, filed Mar. 11, 1976). The present invention is aimed at an improvement in this net jointing structure.

SUMMARY OF THE INVENTION

A principal object of the present invention is to provide a net jointing structure to which a sliding clasp fastener stringer can be fixed with utmost ease.

Another object of the present invention is to provide a net jointing structure which will prevent an attached sliding clasp fastener stringer from getting puckered or otherwise deformed.

Still another object of the present invention is to provide a net jointing structure which can hold an attached sliding clasp fastener stringer stably in place and permit a sliding clasp fastener to function reliably.

According to the invention, a net jointing structure for jointing net ends together has a pair of adapters of a warp-knitted net structure. Each of the adapters has a net region and a web region, the net region being subdivided into at least two net sections one of which is smaller in mesh size than the other. The net section of a smaller mesh size is formed of a plurality of warp chains and is coupled to the web region. The net section of a larger mesh size is adapted for connection with one of the net ends. The web region includes a plurality of warp chain pairs spaced uniformly along the length of the web region, the warp chain pairs being an extension of the warp chains in the net region, and the web region further including inlaid threads connecting and fastening the warp chain pairs together.

Other objects of the invention will be apparent when reading the following detailed description in connection with the accompanying drawings.

DESCRIPTION OF THE PREFERRED EMBODIMENTS

Figure 1:
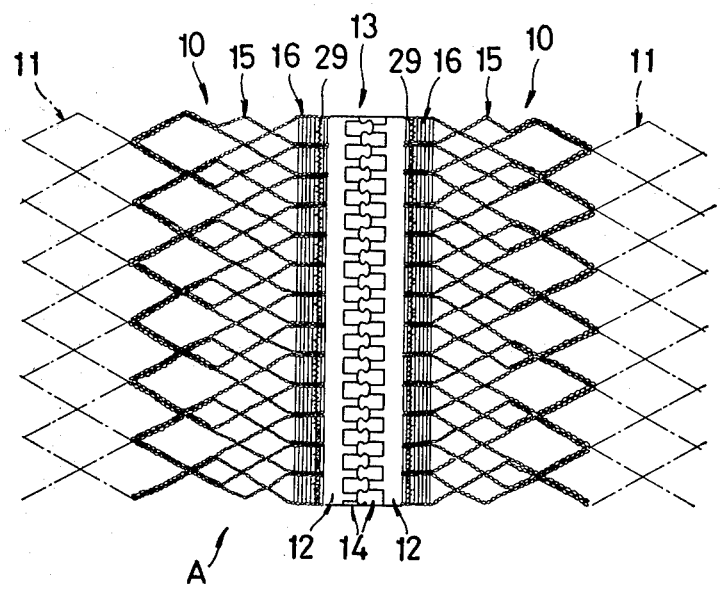
FIG. 1 is a front elevational view of a net jointing structure having a pair of knitted net adapters jointing net ends together by means of a sliding clasp fastener.

In FIG. 1, a net jointing structure A has a pair of warp-knitted net adapters 10,10 attached to the confronting ends of a pair of nets 11,11 and having on and along their inner edges a pair of stringers 12,12 of a sliding clasp fastener 13 with rows 14,14 of scoops mounted along the stringers being interengaged to joint the nets 11,11 together.

Figure 2:
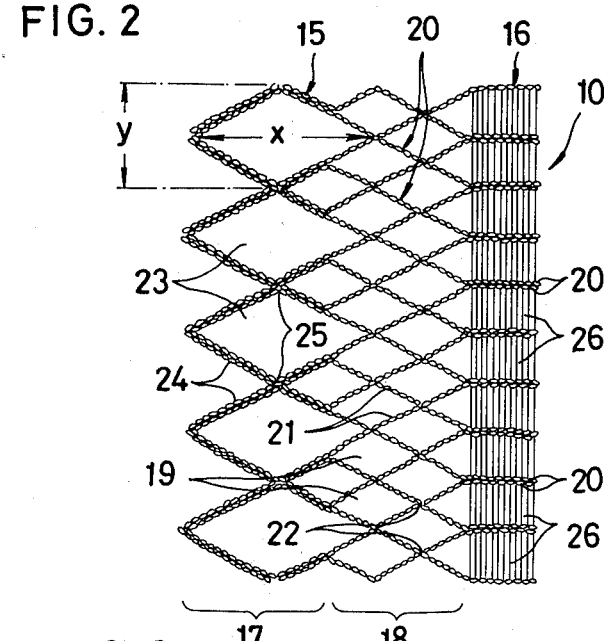
FIG. 2 is an enlarged front elevational view of one of the net jointing adapters shown in FIG. 1.

As shown in FIG. 2, each of the knitted net adapters 10 comprises a net region 15 for being connected to the end of the net 11 and a web region 16 for supporting the fastener stringer 12 thereon. The net region 15 is subdivided into a plurality of sections, two sections 17 and 18 in the illustrated embodiment, the net section 18 being smaller in mesh size than the section 17 and being coupled along its one edge to the web region 16. The net section 18 is formed of a plurality of meshes 19 which in turn are made of a plurality of connected warp chains 20, each mesh having legs or sides 21. Each of the warp chains 20 is united to an adjacent warp chain by a junction point or "knot" 22. The net section 17 has a plurality of meshes 23 each having legs or sides 24 made of a plurality of the paired warp chains 20. Each of the warp chain pairs is united to an adjacent warp chain pair by a junction or "knot" 25.

The web region 16 comprises a plurality of the paired warp chains 20 spaced uniformly along the length of the region 16. Each of the warp chain pairs is an extension of a pair of the legs 21 of each mesh 19 of the net section 18. Additional threads 26 are laid in the web region 16 and connect the warp chain pairs transversely together, the threads 26 being also laid in the warp chains 20 in the net region 15 to reinforce the legs 21,24 and junctions 22,25, as will be described later on.

Figure 3:
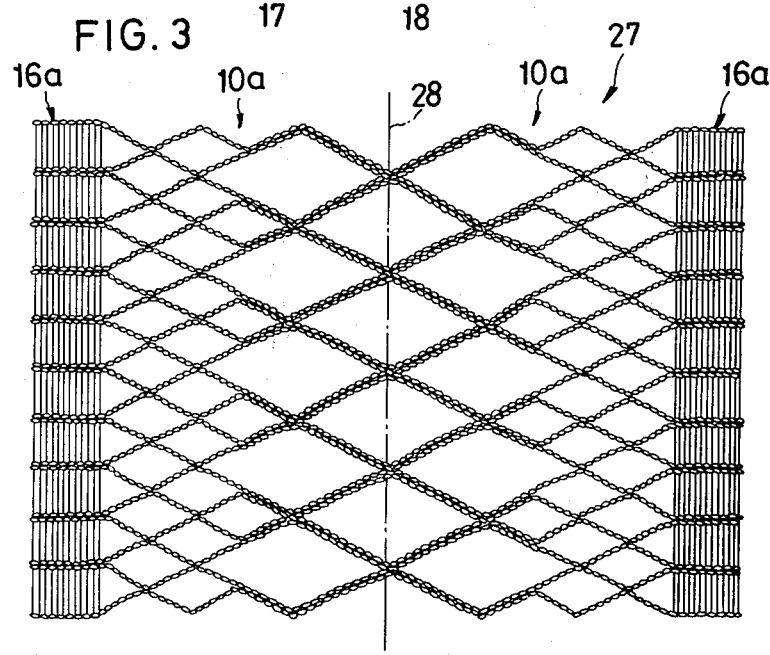
FIG. 3 is a front elevational view showing a knitted net structure to be folded on itself for forming the adapter shown in FIG. 2.

FIG. 3 illustrates a warp-knitted structure 27 having a pair of adapter halves 10a,10a symmetrically arranged with respect to a central line 28. The adapter 10 shown in FIG. 2 is obtained by folding the structure 27 on itself about the line 28 and getting the adapter halves 10a,10a into exactly overlapped relation with each other. The sliding calsp fastener stringer 12 illustrated in FIG. 1 is sandwiched between the web halves 16a,16a of the adapter 10, and fixed to the web halves 16a,16a typically with sewn stitches 29. The knitted net adapter 10 with the fastener stringer 12 thus mounted is preferably knotted along the net section 17 to the end of the net 11 that has substantially the same mesh size as the largest mesh size of the net section 17. The scoop rows 14 can be engaged and disengaged by manipulating a usual slider (not shown) movable therealong.

Figure 4:
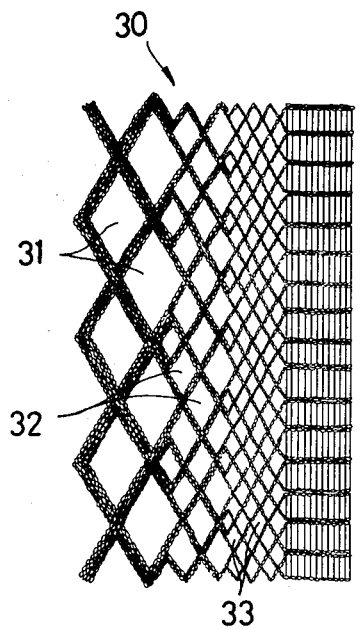
FIG. 4 is a front elevational view of a modified knitted net adapter.

In applications where no excessive loads are expected, the adapter half 10a as a single-layer adapter can be used instead of the adapter 10 of the double-layer type. The adapter 10 shown in FIG. 2 has the meshes 19 and 23 of a horizontally elongated diamond-shape; that is, a horizontal diagonal line $x$ is longer than a vertical diagonal line $y$. According to another embodiment of FIG. 4, a warp-knitted net adapter 30 has three groups of meshes 31,32, and 33 of a vertically elongated diamond-shape, the meshes becoming progressively smaller in size toward the web region. As a further alternative, there may be used a warp-knitted net adapter having square meshes that make a horizontal diagonal line equal in length to a vertical diagonal line. With these latter two modifications, the knitted net adapter can match associated fishing nets much better since the latter usually have meshes of a vertically elongated diamond-shape.

Figure 5:
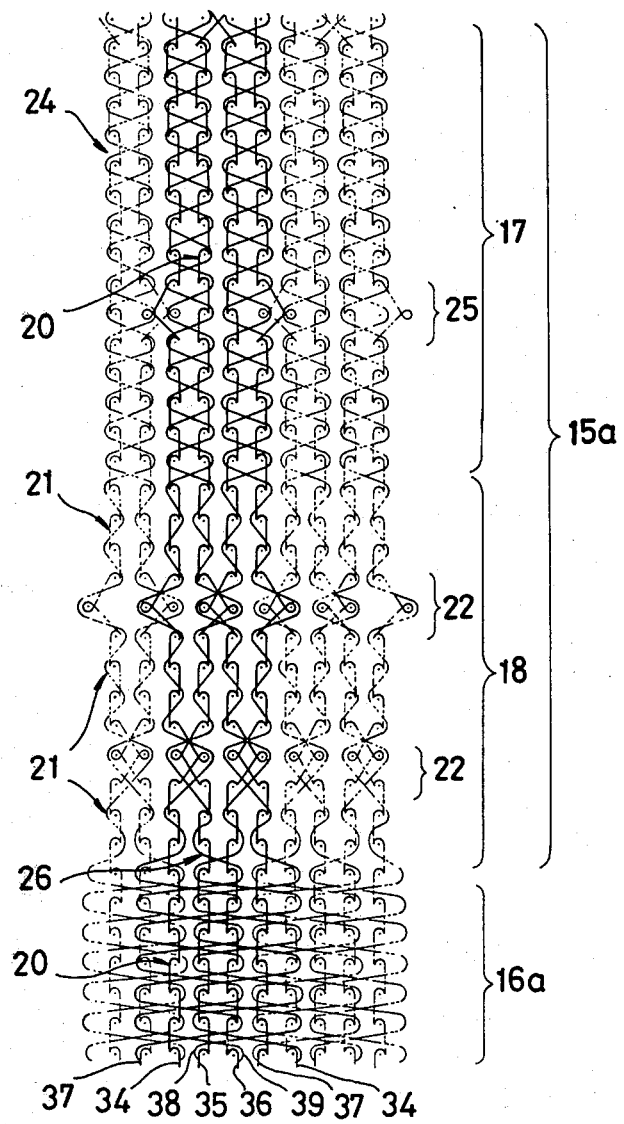
FIG. 5 is a stitch pattern on an enlarged scale for the knitted net adapter.
Figure 6:
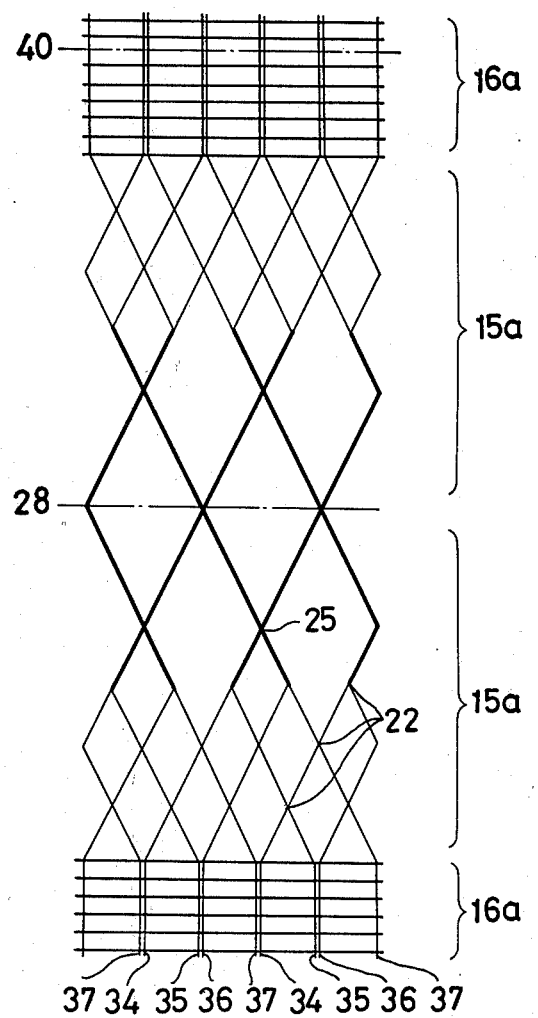
FIG. 6 is an enlarged diagrammatic view of the knitted net structure shown in FIG. 3, which is employed here for facilitating the understanding of FIG. 5.

The structural details of the warp-knitted net adapter 10 will be described with reference to FIGS. 5 and 6. The knitted net structure is composed of four kinds of chain or pillar stitches 34,35,36, and 37 for forming the warp chains 20, and two kinds of inlaid threads 38 and 39 for forming the additional threads 26. Thus, there are required a total of six guide bars, four for the chain stitches and two for the inlaid threads. Every adjacent ones of the chain stitches 34,35,36, and 37 are interknitted with each other to provide the junction points 22 and 25. The guide bars for the inlaid threads 38 and 39 are threaded one in and one out, and lap symmetrically in opposition. The web region half 16a includes the inlaid threads 38 extending transversely across and over every other four wales of the chain stitches, and the inlaid threads 39 extending transversely across and over the remaining every four other wales of the chain stitches. The transversely inlaid threads 38 and 39 thus added in the web region half 16a enable the adjacent chainstitches 37 and 34,35 and 36,37 and 34, to be fastened together, thus providing the paired warp chains 20. In the net section 18, the threads 38 and 39 extend in and along the chain stitches and are interlaced only at the junctions 22, the chain stitches 34 through 37 each constituting the leg 21. The threads 38 and 39 are interlaced throughout the net section 17 and enable the adjacent chain stitches 34 and 35,36 and 37, to be tied together, thus forming the paired warp chains 20 in the net section 17.

Two or more groups of additional threads may be further laid in for reinforcing the junctions 22 and 25, and the legs 21 and 24. In that case, two or more additional guide bars for these threads become necessary. Since the adapter knit fabric is made preferably of synthetic resin such as polyester, the web region half 16a can be cut with heat along a line as at 40 shown in FIG. 6, in which case the cut edge is prevented from unraveling.

With the adapter 10 thus constructed, any deformation produced along the web region 16 can be reduced to a minimum when the adapter net is held under tension in a direction perpendicular to the web region 16. Therefore, the sliding clasp fastener stringer 12 mounted on the web region 16 is prevented from getting wavy, puckered or otherwise deformed, with the results that the sliding clasp fastener 13 can be retained stably in place and be manipulated reliably over a long period of time. Furthermore, the web region 16 thus made compact permits the fastener stringer 12 to be sewn thereon to a nicety and with stability.

A further advantage resulting from the warp-knitted net adapter thus constructed is that the sliding clasp fastener 13 can be additionally protected against deformation or damage under the influence of severe external stresses because such stresses when applied on the net 11 are taken up and distributed uniformly over the entire length of the fastener 13 by means of the net region 15 having varying mesh sizes.

As can be appreciated by the artisan from the foregoing, the invention provides a net jointing structure A for jointing together confronting ends of a primary net structure 11. For such purpose there are provided a pair of warp knitted net adapters 10,10a each adapter having a net transition region 15,15a disposed for connection to a respective end of the primary net structure 11, and a web region 16,16a bearing a stringer 12 of a sliding clasp fastener 13. The stringers 12 associated with the adapters 10 are selectively interengageable by elements 14 to releaseably join the adapters 10 together along a junction line.

The net transition region 15 has a mesh structure defined by warp chains 20, and such mesh structure includes adjoining regions 17,18 of different mesh size. In the FIG. 4 embodiment these adjoining regions are 31,32,33. These regions of different mesh size are arranged with the smallest mesh size region 18,33 adjoining the web region 16, and the largest mesh size region 17,31 being that for connection to the primary net structure.

Warp chains 20 of net transition region 15 extend into web region 16, as seen by FIGS. 1 and 2, transversely to the junction line of slide fastener 13. These warp chains 20 thus also form a part of the web region 16, and included in web region 16 are inlaid threads 26 that connect and fasten together the warp chains 20 within web region 16.

It should be understood that the present invention is not limited to the specific details of construction and arrangement thereof herein illustrated and that changes and modifications may occur to one skilled in the art without departing from the scope of the appended claims.

I claim as my invention:

1. A net jointing structure for jointing together confronting ends of a primary net structure, which jointing structure comprises a pair of warp knitted net adapters; each adapter having a net transition region disposed for connection to a respective end of the primary net structure, and a web region bearing a stringer of a sliding clasp fastener, the stringers associated with said adapters being selectively interengageable to releaseably join said adapters together along a junction line; said net transition region having a mesh structure defined by warp chains, said mesh structure including adjoining regions of different mesh size arranged with the smallest mesh size region adjoining said web region and the largest mesh size region being that for connection to said end of the primary net structure; warp chains of said net transition region extending into said web region transversely to said junction line and forming a part of said web region; said web region further including inlaid threads connecting and fastening together the warp chains in said web region.

2. A net jointing structure according to claim 1 wherein the warp chains of said net transition region extend continuously throughout the different mesh size regions thereof, at least one mesh size region having a mesh structure defined by combining plural warp chains extending from an adjoining region of smaller mesh size.

3. A net jointing structure according to claim 1 including inlaid threads extending lengthwise in and along said warp chains in the net transition region.

* * * * *